US007395592B2

(12) United States Patent
Matsumura

(10) Patent No.: US 7,395,592 B2
(45) Date of Patent: Jul. 8, 2008

(54) APPARATUS FOR PROCESSING ELECTRICAL CONNECTION TERMINAL FOR COAXIAL CABLE

(75) Inventor: Hiroshi Matsumura, Sabae (JP)

(73) Assignee: Meiyu-Giken Co., Ltd., Fukui (JP)

( * ) Notice: Subject to any disclaimer, the term of this patent is extended or adjusted under 35 U.S.C. 154(b) by 425 days.

(21) Appl. No.: 10/500,233

(22) PCT Filed: Sep. 13, 2002

(86) PCT No.: PCT/JP02/09475

§ 371 (c)(1), (2), (4) Date: Jun. 25, 2004

(87) PCT Pub. No.: WO03/058784

PCT Pub. Date: Jul. 17, 2003

(65) Prior Publication Data

US 2005/0076500 A1 Apr. 14, 2005

(30) Foreign Application Priority Data

Dec. 28, 2001 (JP) ............................ 2001-398656

(51) Int. Cl.
*B23P 23/00* (2006.01)

(52) U.S. Cl. ...................... 29/564.8; 29/33 F; 29/33 M; 29/828; 29/867; 29/863; 72/470; 72/407; 72/416

(58) Field of Classification Search .................. 29/828, 29/867, 564.8, 33 F, 33 M, 863; 72/470, 72/407, 416
See application file for complete search history.

(56) References Cited

U.S. PATENT DOCUMENTS 4,719,697 A * 1/1988 Schwartzman et al. ........ 29/867
6,604,268 B1 * 8/2003 Fujita et al. ................. 29/33 F

FOREIGN PATENT DOCUMENTS

JP 52-27345 9/1993
JP 2001-309522 11/2001

* cited by examiner

*Primary Examiner*—Rick K Chang
(74) *Attorney, Agent, or Firm*—Hodgson Russ LLP

(57) ABSTRACT

An apparatus for processing of an electrical connection terminal for a coaxial cable, wherein the processing is automated and further laborsaving can be achieved in the processing operation. The apparatus comprises a tool means 11 for axially stripping an outer-side insulator layer 5 in a terminal portion of a coaxial cable 1 by a predetermined length and supporting the stripped terminal portion of the coaxial cable, a turn means for tilting an axis $A_{x1}$ of the tool means by an angle of α degrees with respect to an axis $A_{x2}$ of the coaxial cable to thereby turn the tool means, and an advancing/retreating means for advancing/retreating the tool means on the axis of the coaxial cable, wherein a clearance is provided between an inner-side insulator layer 3 and a mesh-type conductor layer 4 by turning the tool means using the turn means to thereby expand the mesh-type insulator layer into a conical shape 6.

1 Claim, 5 Drawing Sheets

APPARATUS FOR PROCESSING ELECTRICAL CONNECTION TERMINAL FOR COAXIAL CABLE

TECHNICAL FIELD

The present invention relates to a coaxial cable, which is an electric wire for communication system, of such a type that a core wire is covered by a different mesh-type conductor layer in a coaxial cylindrical manner, more particularly to a method and apparatus for processing an electrical connection terminal for the coaxial cable.

BACKGROUND TECHNOLOGY

As well known, a coaxial cable is often used in a communication system. A typical coaxial cable has such a constitution that a core wire (internal conductor) has a different mesh-type conductor layer (external conductor) around it organized in a coaxial cylindrical manner via an inner-side insulator layer, the mesh-type conductor layer being covered by an outer-side insulator layer. The coaxial cable has the following problems particularly in forming an electrical connection terminal with respect to the mesh-type conductor layer: 1) layers of the mesh-type conductor layer are so closely attached to the inner-side insulator layer with no clearance therebetween that it is difficult to insert a working tool between the mesh-type conductor layer and the inner-side insulator layer, 2) the mesh-type conductor layer is so closely woven in a mesh-like manner that it cannot be dissolved in a simple manner, 3) it is necessary for the mesh-type conductor layer to be folded because an entire circumference thereof has to be evenly dissolved for an even dissolution, whereas the mesh-type conductor layer is not easily folded, and the like. Therefore, it requires such a complicated process and a lengthened time to form the electrical connection terminal.

Therefore, a main object of the present invention is to provide a method of and apparatus for processing the electrical connection terminal for the coaxial cable, wherein the processing with respect to the electrical connection terminal for the coaxial cable is automated to realize an easier and more reliable processing so that laborsaving can be promoted for the processing operation with respect to the electrical connection terminal for the coaxial cable.

DISCLOSURE OF THE INVENTION

The present invention, in order to achieve the foregoing object, basically offers a method of processing an electrical connection terminal for a coaxial cable, wherein a core wire (internal conductor) has a different mesh-type conductor layer (external conductor) around it organized in a coaxial cylindrical manner via an inner-side insulator layer, the mesh-type conductor layer being covered by an outer-side insulator layer. The method of processing the electrical connection terminal for the coaxial cable comprises a step of axially stripping the outer-side insulator layer in a terminal portion of the coaxial cable by a predetermined length, to thereby provide a clearance between the inner-side insulator layer and the mesh-type conductor layer so that the mesh-type conductor layer is expanded into a conical shape, supporting by a tool means the stripped terminal portion of the coaxial cable, and tilting an axis of said tool means by an angle of α degrees with respect to an axis of said coaxial cable to thereby turn said tool means; and a step of folding the mesh-type conductor layer expanded into the conical shape outside of the outer-side insulator layer, for folding outside of said outer-side insulator layer said mesh-type conductor layer by an advancing/retreating means on the tool means.

Further, the present invention offers an apparatus for processing the electrical connection terminal for the coaxial cable, wherein the core wire (internal conductor) has the different mesh-type conductor layer (external conductor) around it organized in the coaxial cylindrical manner via the inner-side insulator layer, the mesh-type conductor layer being covered by the outer-side insulator layer. The apparatus for processing the electrical connection terminal for the coaxial cable comprises a tool means for axially stripping the outer-side insulator layer in the terminal portion of the coaxial cable by the predetermined length and supporting the stripped terminal portion of the coaxial cable, a turn means for tilting an axis of the tool means with respect to an axis of the coaxial cable by an angle of α degrees to thereby turn the tool means, and an advancing/retreating means for advancing and retreating the tool means on the axis of the coaxial cable, interfacing the axis of said tool means with the axis of said coaxial cable, wherein the clearance is provided between the inner-side insulator layer and the mesh-type conductor layer by turning the tool means using the turn means to thereby expand the mesh-type conductor layer into the conical shape so that the mesh-type conductor layer expanded into the conical shape is folded outside of the outer-side insulator layer in response to the forward motion by the advancing/retreating means.

The present invention further offers the apparatus for processing the electrical connection terminal for the coaxial cable, wherein the tool means is comprised of a tool member, and the tool member is comprised of an outer-side cylindrical member supported by the advancing/retreating means and an inner-side cylindrical member axially supported in an expanding and energizing manner inside of the outer-side cylindrical member and supporting the stripped terminal portion of the coaxial cable.

BRIEF DESCRIPTION OF THE DRAWINGS

FIG. 1$A_1$ is a schematic perspective view of a state in which an outer-side insulator layer is stripped. FIG. 1$A_2$ is a schematic side view of the stripped state, showing a mesh-type conductor layer alone in section. FIG. 1$B_1$ is a schematic perspective view of a state in which the mesh-type conductor layer is expanded into a conical shape, and FIG. 1$B_2$ is a schematic side view thereof. FIG. 1$C_1$ is a schematic perspective view of a state in which the mesh-type conductor layer is folded outside of the outer-side insulator layer, and FIG. 1$C_2$ is a schematic side view thereof.

FIG. 2A is a schematic plane view showing an initial state in which a tool member of the apparatus according to the present invention is set with respect to the coaxial cable. FIG. 2B is a schematic plane view showing a state in which the tool member of the apparatus according to the present invention is shifted in angle and turned to thereby expand the mesh-type conductor layer into the conical shape. FIG. 2C is a schematic plane view illustrating an enlarged main part of the state illustrated in FIG. 2B.

FIG. 3A is a schematic plane view illustrating a state in which the tool member is returned to the initial set position. FIG. 3B is a schematic plane view illustrating a state in which the tool member is advanced to thereby further expand the mesh-type conductor layer. FIG. 3C is a schematic plane view illustrating a state in which the tool member is advanced to thereby fold the mesh-type conductor layer outside of the outer-side insulator layer by means of an outer-side cylindrical member.

DESCRIPTION OF THE PREFERRED EMBODIMENT

Figure 1:
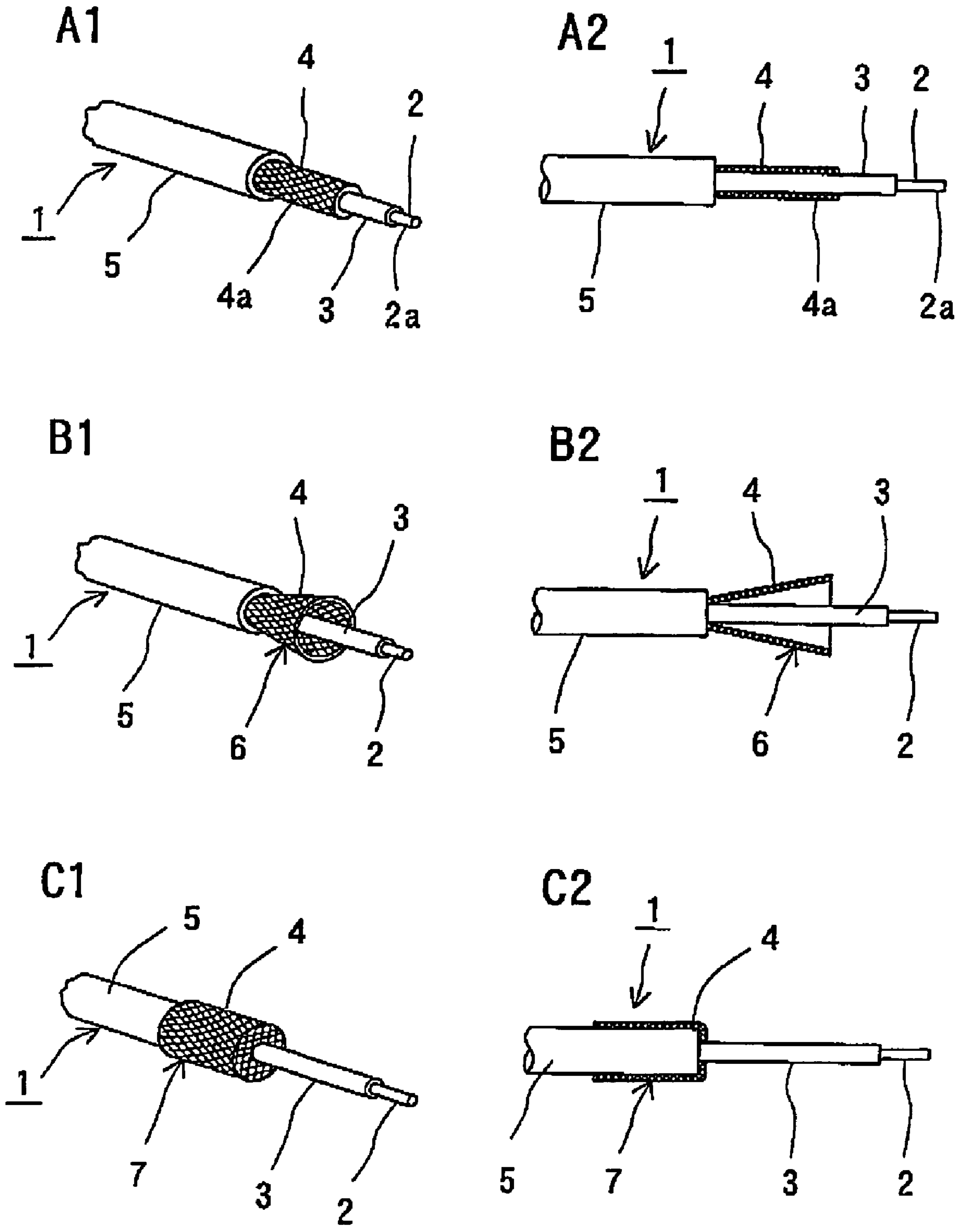
FIG. 1 is a view for describing an essential step in a method of and apparatus for processing an electrical connection terminal for a coaxial cable according to the present invention.

Hereinafter, a preferred embodiment of a method of and apparatus for processing an electrical connection terminal for a coaxial cable according to the present invention is described referring to the foregoing drawings. In the present invention, a coaxial cable 1 subject to processing has such a constitution that a core wire 2 (internal conductor) has a different mesh-type conductor layer 4 (external conductor) around it organized in a coaxial cylindrical manner via an inner-side insulator layer 3, and the mesh-type conductor layer 4 is covered by an outer-side insulator layer 5. The mesh-type conductor layer 4 of the coaxial cable 1 is formed from a large number of thin conductor wires woven in a mesh-like manner, which are too tightly organized to be easily dissolved. The mesh-type conductor layer 4 is formed to closely overlap the inner-side insulator layer 3.

In the formation of the electrical connection terminal on a terminal side of the coaxial cable 1 having the foregoing constitution, there is no problem in forming an electrical connection portion 2*a* with respect to the core wire 2 which is the internal conductor, while it is very difficult to form an electrical connection portion 4*a* with respect to the mesh-type conductor layer 4 which is the external conductor. A process required in order to form the electrical connection portion 4*a* in a terminal portion of the mesh-type conductor layer 4 of the coaxial cable 1, is that, first, the outer-side insulator layer 5 is axially stripped by a predetermined length so that the mesh-type conductor layer 4 is exposed, and a short while later, the mesh-type conductor layer 4 is dissolved evenly throughout a circumference thereof and also folded outside of the outer-side insulator layer 5, to thereby provide a conductor layer formed from the mesh-type conductor as uniform as possible around an outer periphery of the outer-side insulator layer 5.

The present invention has its object in automating such a complicated and difficult operation in an extremely effective manner and provides a specific method and apparatus to achieve the object. An example of a basic step of the method of processing the electrical connection terminal for the coaxial cable according to the present invention is first described referring to FIG. 1. In the method of processing the electrical connection terminal for the coaxial cable 1 according to the present invention, as a first step, the outer-side insulator layer 5 in the terminal portion of the coaxial cable 1 is axially stripped by the predetermined length (see FIGS. 1 $A_1$ and 1 $A_2$). In the foregoing state, the mesh-type conductor layer 4 is gradually expanded while providing a clearance, which is even throughout a circumference thereof, between the inner-side insulator layer 3 and the mesh-type conductor layer 4 of the coaxial cable 1, to be thereby arranged in a conical shape 6 (see FIGS. 1$B_1$ and 1$B_2$). Second, the mesh-type conductor layer 4 expanded into the conical shape is pushed to further expand so that the mesh-type conductor layer 4 is finally folded outside of the outer-side insulator layer 5 to form a folded exposure portion 7 (see FIGS. 1$C_1$ and 1$C_2$).

The processing method according to the present invention has two important aspects. One of them is that the mesh-type conductor layer 4 is gradually expanded while providing the clearance, which is circumferentially even, between the inner-side insulator layer 3 and the mesh-type conductor layer 4 of the coaxial cable 1, to be thereby arranged in the conical shape 6. In the present invention, a means for expanding the mesh-type conductor layer 4 into the conical shape 6 employs a method in respective illustrations of FIG. 2. According to the method, first, the portion, which is axially stripped by the predetermined length, of the outer-side insulator layer 5 in the terminal portion of the coaxial cable 1 is supported by a tool member described later, and an axis $A_{x1}$ of the tool member is tilted by an angle of α degrees with respect to an axis $A_{x2}$ of the coaxial cable 1 to thereby turn the tool member so that the mesh-type conductor layer 4 is expanded evenly throughout the circumference thereof into the conical shape 6.

The other important aspect of the processing method according to the present invention is that the mesh-type conductor layer 4 expanded into the conical shape is folded outside of the outer-side insulator layer 5 to thereby form the folded exposure portion 7. According to the present invention, a means for folding the mesh-type conductor layer 4 outside of the outer-side insulator layer 5 employs a method illustrated in respective illustrations of FIG. 3. In the method, after the mesh-type conductor layer 4 is expanded into the conical shape 6 as described, the shaft line $A_{x1}$ of the tool member is interfaced with the shaft line $A_{x2}$ of the coaxial cable 1, and the mesh-type conductor layer 4 is pushed to be further expanded with the advancement of the tool member so that the mesh-type conductor layer 4 is finally folded outside of the outer-side insulator layer 5 to thereby form the circumferentially even folded exposure portion 7.

Figure 2:
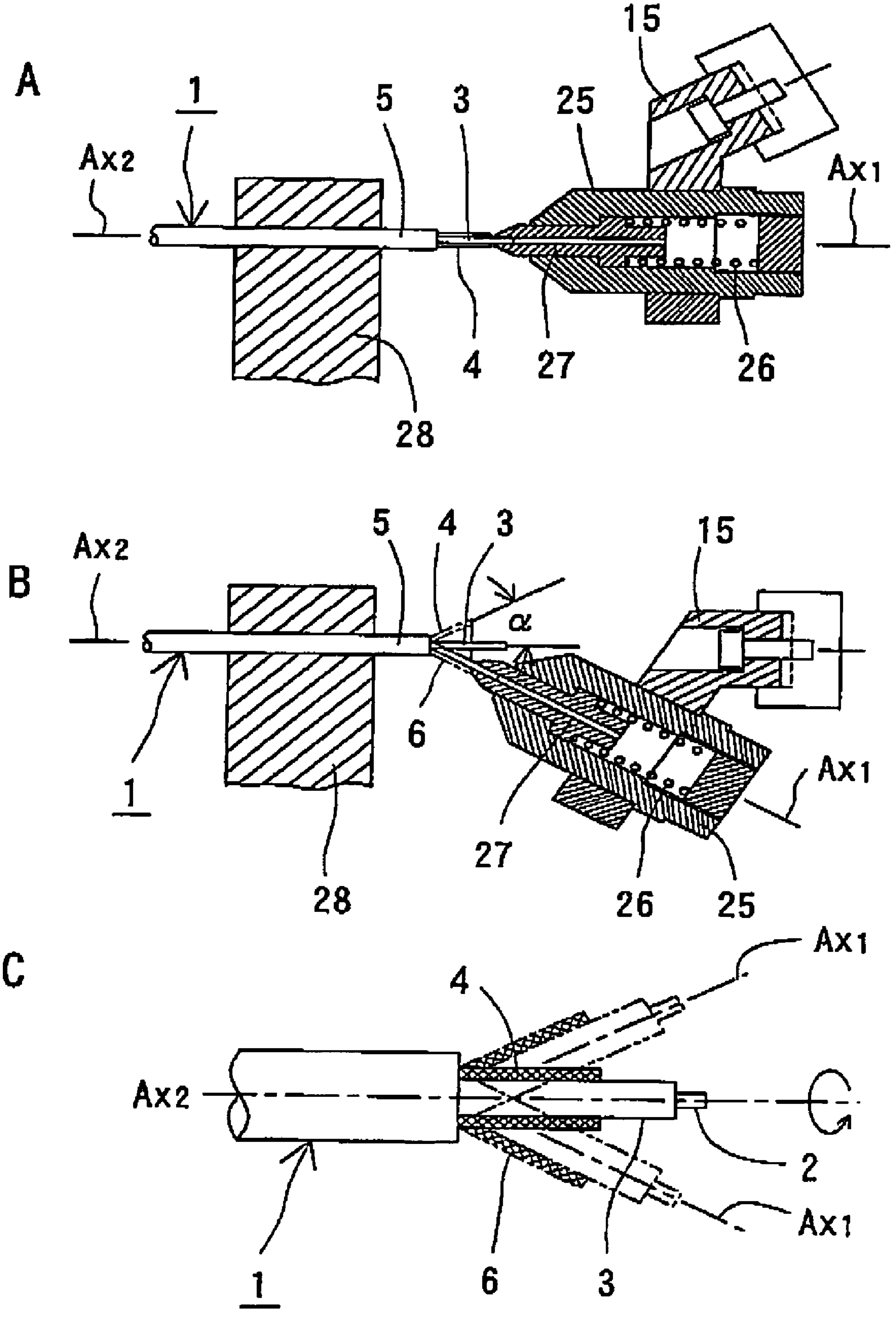
FIGS. 2 and 3 is a view illustrating a step of folding the mesh-type conductor layer by means of the apparatus for processing the electrical connection terminal for the coaxial cable according to the present invention.
Figure 3:
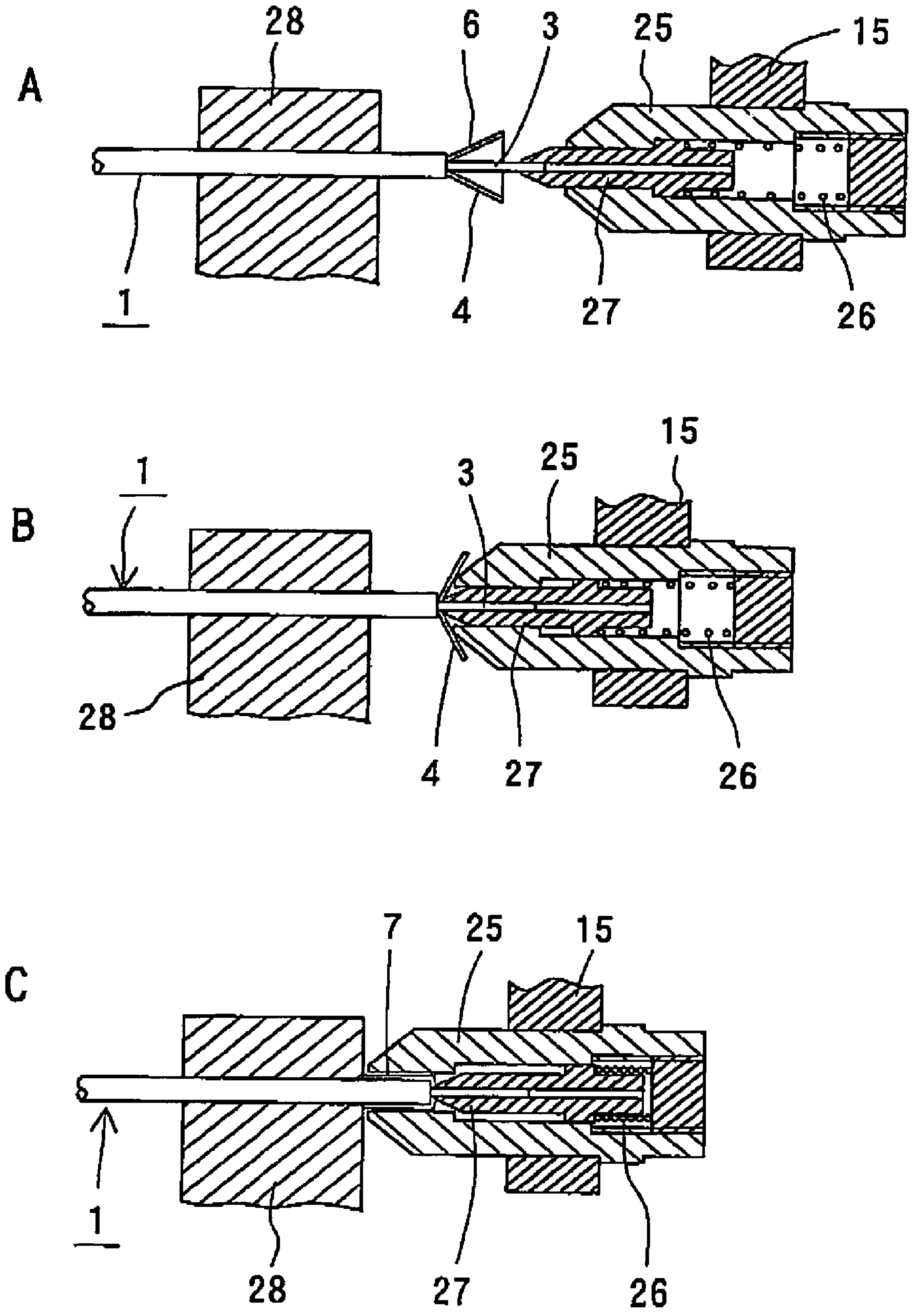
Figure 4:
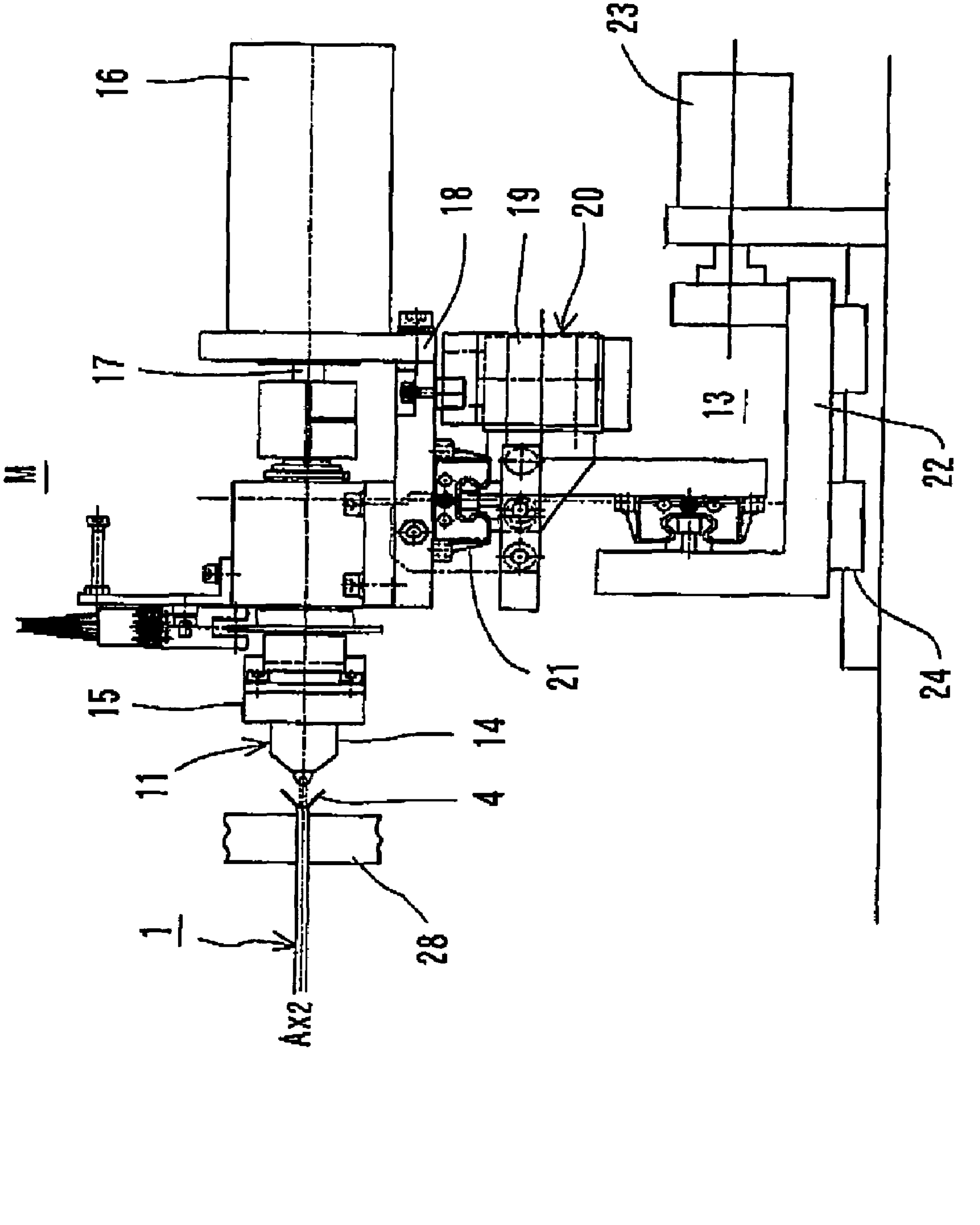
FIG. 4 is a schematic front view illustrating an example of the apparatus for processing the electrical connection terminal for the coaxial cable according to the present invention.
Figure 5:
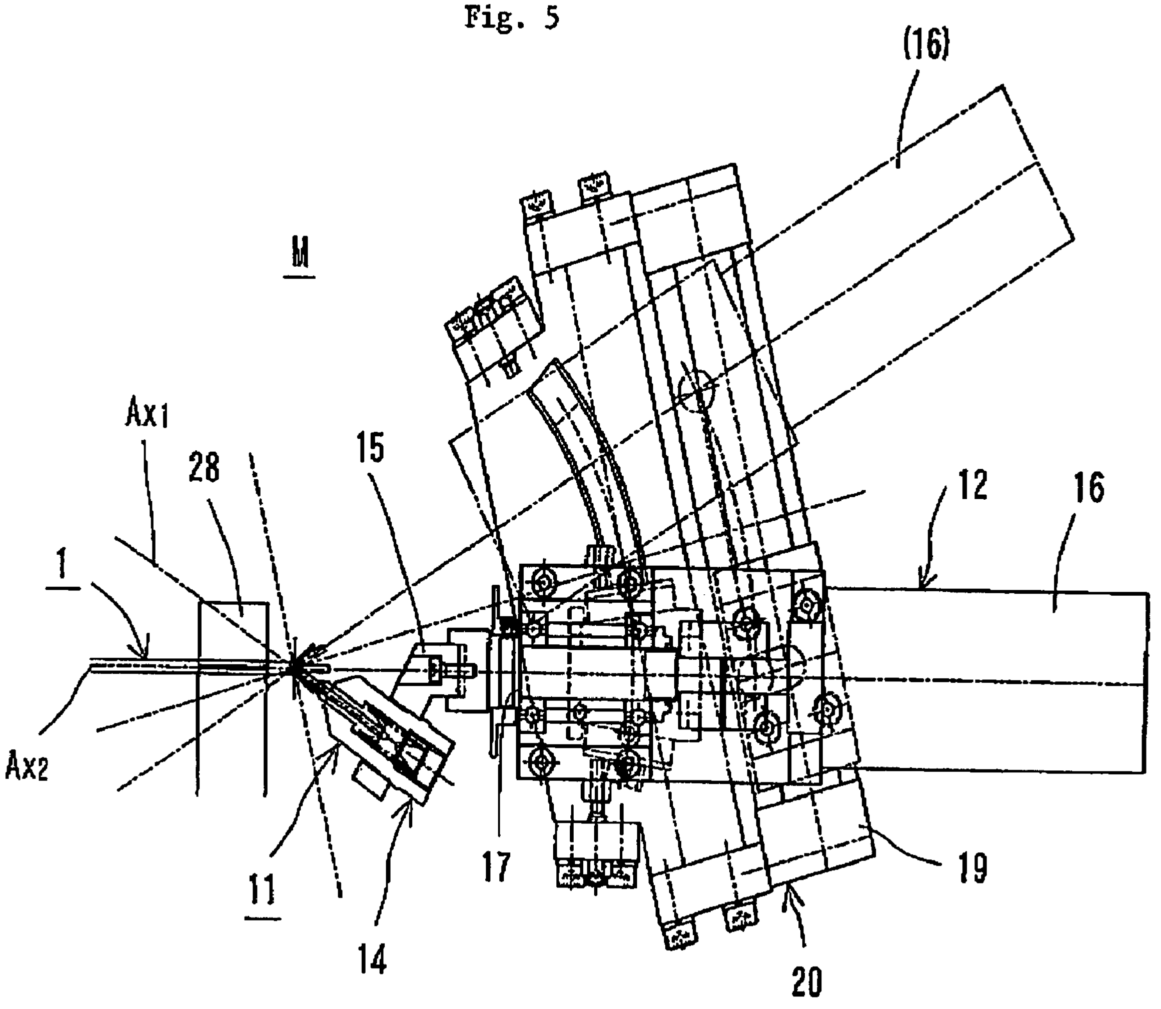
FIG. 5 is a schematic plane view of the apparatus according to the present invention.

FIGS. 4 and 5 show a specific example of the processing apparatus capable of realizing the method of processing the electrical connection terminal for the coaxial cable according to the present invention. FIGS. 2 and 3 show a specific constitution of the tool means of the apparatus according to the present invention and steps of the processing performed by the tool means.

An apparatus M for processing the electrical connection terminal for the coaxial cable according to the present invention comprises a tool means 11, the tool means 11 axially stripping the outer-side insulator layer 5 in the terminal portion of the coaxial cable 1 by the predetermined length and supporting the stripped terminal portion of the coaxial cable, a turn means 12, the turn means 12 tilting the axis $A_{x1}$ of the tool means 11 with respect to the axis $A_{x2}$ of the coaxial cable 1 by the angle of α degrees to thereby turn the tool means 11, and an advancing/retreating means 13, the advancing/retreating means 13 interfacing the axis $A_{x1}$ of the tool means 11 with the axis $A_{x2}$ of the coaxial cable to thereby advance or retreat the tool means 11 on the axis $A_{x2}$ of the coaxial cable, wherein the clearance is provided between the inner-side insulator layer 3 and the mesh-type conductor layer 4 by turning the tool means 11 using the turn means 12 to thereby expand the mesh-type conductor layer 4 into the conical shape 6, and the mesh-type conductor layer 4 expanded into the conical shape 6 is folded outside of the outer-side insulator layer 5 in response to the forward motion by the advancing/retreating means 13 to thereby form the circumferentially uniform folded exposure portion 7.

In the present invention, the tool means 11 is comprised of a tool member 14, a specific constitution of which is shown in FIGS. 2 and 3. The tool member 14 is supported by a tool member support arm 15. The tool member support arm 15 is, as shown in FIG. 2B, attached to a rotary shaft 17 of a rotary drive source 16 serving to turn the tool member 14, which is tilted by the angle of α degrees with respect to the axis $A_{x2}$ of the coaxial cable, around the axis $A_{x2}$.

The turn means 12 including the rotary drive source 16 is installed in a mounting body 18. The mounting body 18 is supported so as to be rotatably positioned by a rotation means 20 including an actuator 19. The rotation means 20 includes a guide rail mechanism 21, and is capable of positioning the tool member 14, in response to the operation of the actuator 19, at a position shown in FIG. 2A (position where the axis $A_{x1}$ of the tool member 14 is interfaced with the axis $A_{x2}$ of the coaxial cable) and a position shown in FIG. 2B (position where the axis $A_{x1}$ of the tool member 14 is tilted by the angle of α degrees with respect to the axis $A_{x2}$ of the coaxial cable) via the mounting body 18 and the turn means 12, and rotating in a reciprocating motion between the two positions.

Further, in the present invention, the apparatus M for processing the electrical connection terminal for the coaxial cable according to the present invention includes the advancing/retreating means 13. The advancing/retreating means 13 is comprised of, for example, an advancing/retreating table 22, a reciprocating motion drive source 23, and a advancing/retreating guide 24. The advancing/retreating table 22 of the advancing/retreating means 13 is provided with the rotation means 20, mounting body 18, and turn means 12, and arranged to reciprocate the tool means 14 from a position shown in FIG. 3A to a position shown in FIG. 3C via the provided components therein.

Meanwhile, in the present invention, the tool means 11 is comprised of the tool member 14. The tool member 14 is comprised of an outer-side cylindrical member 25 supported by the advancing/retreating means 13 via the tool member support arm 15 and an inner-side cylindrical member 27 axially supported in an expanding and energizing manner by a spring means 26 inside of the outer-side cylindrical member 25 and supporting the stripped terminal portion of the coaxial cable 1.

When the tool member 14 having the foregoing constitution, at a position interfaced with the axis $A_{x2}$ of the coaxial cable, is advanced from the position shown in FIG. 3A to the position shown in FIG. 3C by the advancing/retreating means 13, the inner-side cylindrical member 27 stops at the position shown in FIG. 3B, while the outer-side cylindrical member 25, in response to the further advancement by the advancing/retreating means 13, advances against an expanding and energizing force of the spring means 26 and further pushes and expands the mesh-type conductor layer 4 to thereby fold the mesh-type conductor layer 4 outside of the outer-side insulator layer 5 so that the circumferentially uniform folded exposure portion 7 is formed. A reference numeral 28 in the drawings is a retaining member for retaining the coaxial cable 1.

INDUSTRIAL APPLICABILITY

The method of and apparatus for processing the electrical connection terminal for the coaxial cable having the foregoing constitution according to the present invention can offer a very effective operation in that the processing of the electrical connection terminal for the coaxial cable is automated to thereby implement the processing more easily and reliably, and further, labor saving can be achieved in the processing of the electrical connection terminal for the coaxial cable, wherein a core wire (internal conductor) has a different mesh-type conductor layer (external conductor) around it organized in a coaxial cylindrical manner via an inner-side insulator layer, the mesh-type conductor layer being covered by an outer-side insulator layer. The method of processing the electrical connection terminal for the coaxial cable comprises a step of axially stripping the outer-side insulator layer in an terminal portion of the coaxial cable by a predetermined length to thereby provide a clearance between the inner-side insulator layer and the mesh-type conductor layer so that the mesh-type conductor layer is expanded into a conical shape, supporting by a tool means the stripped terminal portion of the coaxial cable, and tilting an axis of said tool means by an angle of a degrees with respect to an axis of said coaxial cable to thereby turn said tool means; and a step of folding the mesh-type conductor layer expanded into the conical shape outside of the outer-side insulator layer, for folding outside of said outer-side insulator layer said mesh-type conductor layer by an advancing/retreating means on the tool means.

The invention claimed is:

1. An apparatus for processing an electrical connection terminal for a coaxial cable; wherein a core wire (internal conductor) has a different mesh-type conductor layer (external conductor) around the core wire organized in a coaxial cylindrical manner via an inner-side insulator layer, the mesh-type conductor layer being covered by an outer-side insulator layer, the apparatus comprising:

- a tool means for axially stripping the outer-side insulator layer in a terminal portion of the coaxial cable by a predetermined length and supporting the stripped terminal portion of the coaxial cable;
- a turn means for tilting an axis of the tool means and the core wire by an angle of α degrees with respect to an axis of the coaxial cable to thereby turn the tool means; and
- an advancing/retreating means for advancing and retreating the tool means on the axis of the coaxial cable, interfacing the axis of said tool means with the axis of said coaxial cable, wherein a clearance is provided between the inner-side insulator layer and the mesh-type conductor layer by turning the tool means using the turn means to thereby expand the mesh-type insulator layer into a conical shape so that the mesh-type conductor layer expanded into the conical shape is folded outside of the outer-side insulator layer in response to a forward motion by the advancing/retreating means,
- wherein the tool means is comprised of a tool member, and
- the tool member is comprised of an outer-side cylindrical member supported by the advancing/retreating means and an inner-side cylindrical member axially supported in an expanding and energizing manner inside of the outer-side cylindrical member and supporting the stripped terminal portion of the coaxial cable.

* * * * *